United States Patent

Jeschke

[11] 4,037,619
[45] July 26, 1977

[54] THREE-POINT REGULATOR WITH FEEDBACK

[75] Inventor: Norbert Jeschke, Dietzenbach, Germany

[73] Assignee: Samson Apparatebau AG, Frankfurt am Main, Germany

[21] Appl. No.: 707,771

[22] Filed: July 20, 1976

Related U.S. Application Data

[63] Continuation of Ser. No. 410,390, Oct. 29, 1973, abandoned.

[51] Int. Cl.² .................. F16K 31/12; F16K 31/36; F15B 13/16
[52] U.S. Cl. .................. 137/492.5; 91/388; 91/433
[58] Field of Search .................. 91/365, 388, 433; 137/492.5, 492, 488

[56] References Cited

U.S. PATENT DOCUMENTS 2,285,540   6/1942   Stein et al. .................. 91/433

FOREIGN PATENT DOCUMENTS 1,018,274   1/1953   France .................. 137/488

Primary Examiner—Paul E. Maslousky
Attorney, Agent, or Firm—Watson, Cole, Grindle & Watson

[57] ABSTRACT

The specification describes a three-point regulator, for example of the pneumatic type, in the case of which with a drop and a rise in the measurement value of the regulation quantity after overcoming an operating distance a respective switch is operated. One switch is moved or turned by a servo-member (motor) in one direction and the other switch is moved or turned by the servo-member in the other direction. A feedback is provided which acts on both switches in such a manner that the operating distance is increased and accordingly the switched-on switch is switched off.

4 Claims, 8 Drawing Figures

4,037,619

THREE-POINT REGULATOR WITH FEEDBACK

This is a continuation, of application Ser. No. 410,390 filed Oct. 29, 1973, now abandoned.

BACKGROUND OF INVENTION

Field to Which Invention Relates

The invention relates to a three-point regulator, and more particularly to a pneumatic regulator, in the case of which with a drop and a rise in the measurement value of the regulation quantity after overcoming an operating distance a respective switch is operated, and one of the switches moves or rotates a servo-member (motor) in the one direction and the other moves or turns the servo-member in the other direction.

The object of the invention is to improve previously known three-point regulators of this type and to simplfy them.

Brief Description of the Figures

FIG. 2a represents a sudden discontinuity in the regulated value $X_w$ as a function of time;

FIG. 2b shows the regulator response outputs $Y_e$ to the input signal $X_w$ of FIG. 2a; and FIG. 2c illustrates the switching output Y responsive to the output $Y_e$ of FIG. 2b;

THE PRIOR ART

Figure 1:
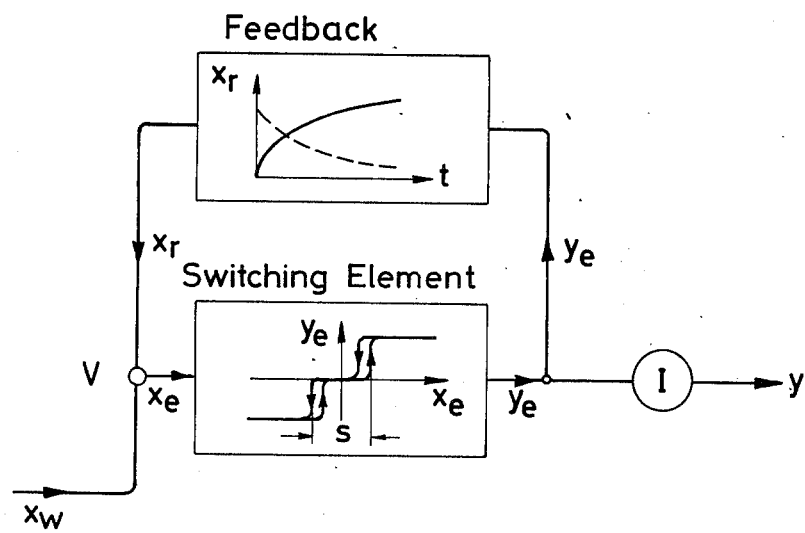
FIG. 1 illustrates the principle of operation of prior art three-point regulators.
Figure 2:
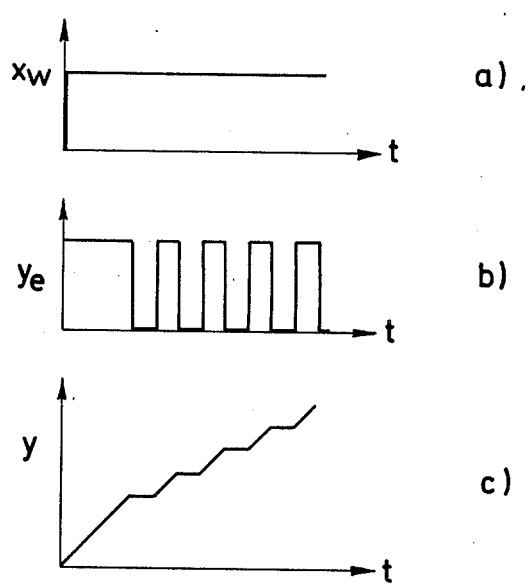

Previously proposed three-point regulators with feedback operate in accordance with the principle shown in FIG. 1 of the drawing. When in the operating member the input quantity $x_e$ exceeds the operating distance plus or minus s, a positive or negative output signal $y_e$ is produced, which drives an integrally operating servo-member I (for example a motor) in one direction or the other. The output quantity or signal $y_e$ is converted by the feedback function into $x_r$. In the comparison member V $x_r$ is compared with $x_w$. If $x_r$ reaches the value $x_w$, $x^e = 0$ and consequently also the output value $x_e = 0$. The integral servo-member I remains stationary or stops and in accordance with the function of the feedback the value $x_r$ is reduced again and if on comparison with $x_w$ the value $(x_w-x_r)$ is greater than half the operating distance, $y_e$ becomes positive again. This operation is repeated until the regulated deviation becomes zero. The regulation does not occur continuously but in individual sequentially following pulses. If there is a suddenly occurring discontinuity in the regulation value, as is shown in FIG. 2a, the regulation output quantity or value $y_e$ is arrived at, as is shown in FIG. 2b.

After the first switching off of the regulator output value there follow short individual switching-on operations. FIG. 2c shows the course of the setting magnitude y. This increases when the servo-member is switched on with an approximately constant velocity and when the servo-member is switched off, y is kept constant.

SUMMARY OF INVENTION

In contrast to prior art, the three-point regulator in accordance with the invention is in essence characterized by a feedback means which acts on both switches in such a manner that the operating distance s is increased and accordingly the switched-on switch is switched off. switchd of.

In the case of the three-point regulator in accordance with the invention the output value $x_r$ of the feedback is not directly compared with the actual reglulated value and instead the switching of the operating member is switched back again because that the feedback increases the operating distance in both directions both with respect to increasing and decreasing regulated values.

For the invention the particular type and arrangement of the feedback is important, which has not previously been proposed even in electrical or electronic regulators and for the regulation characteristic offers advantages which are of practical importance. Thus in accordance with the invention, the feedback does not increase the input value $x_e$ of the operating or switching member in order to bring about the switching, which causes an increase in non-linearity. Accordingly in the case of suitable matching the damping is increased and a rapid dying away of sudden or large discontinuities in the magnitude of the regulated alue is obtained.

In accordance with an advantageous development of the invention the switches can be operated by means of an intermediate member, which is displaced by the measurement quantity in one direction and by the feedback in another direction preferably approximately perpendicular to it.

An advantageous embodiment of the invention is furthermore characterized in that the switches are operated or switchd by means of an intermediate member which is turned by the measurement value or is displaced by the feedback in the axial direction, or vice versa.

In the drawing the invention is shown by way of example, as will be explained in more detail in the following description.

DESCRIPTION OF PREFERRED EMBODIMENTS

Figure 3:
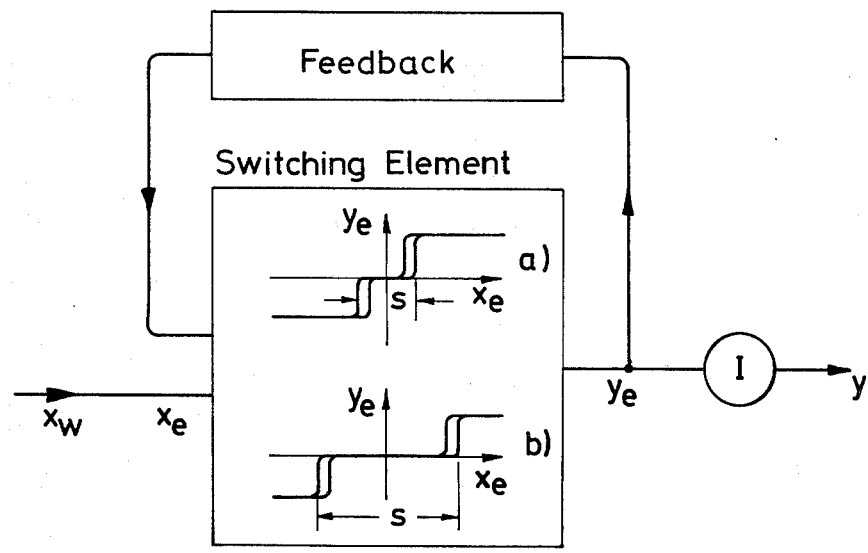
FIG. 3 shows the principle of operation of the present invention.

FIG. 3 is intended to show the manner of operation of the regulator of the present invention. In the operating member the function of the regulator output value $y_e$ is represented both before switching of the feedback (graph a) and after the action of the feedback (graph b.) This arrangement has the advantage that the normal regulation operates just as is the case with conventional three-point regulators, but in the case of sudden pronounced departures or deviations of the regulated quantity the regulator becomes less sensitive, that is to say less inclined to large scale hunting. Furthermore, only one feedback is required, which facilitates the setting of the regulator and with particular application of a pneumatic regulator, involves simplification of construction and therefore a saving as regards the costs of manufacture of the regulator.

Figure 4:
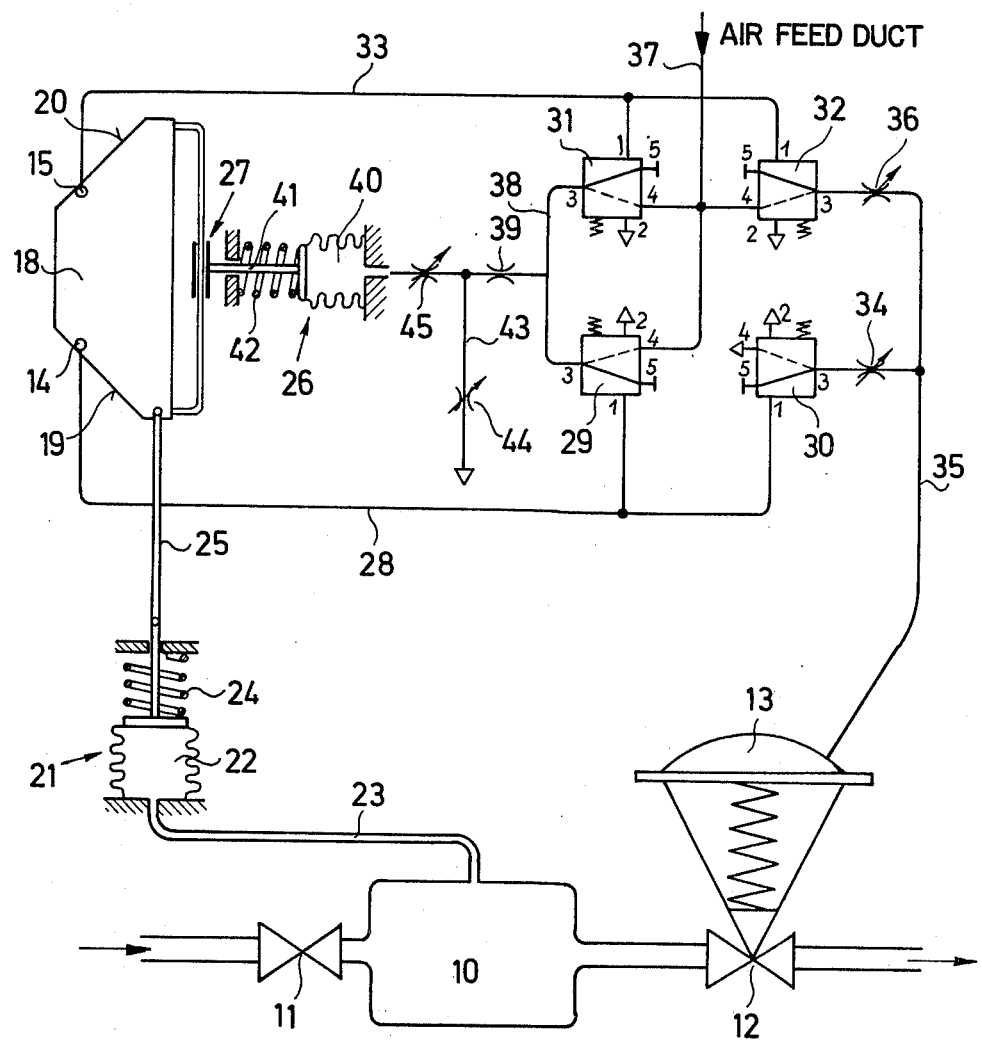
FIG. 4 shows an exemplary embodiment of a regulator in accordance with the invention.

In what follows an example of a pneumatic three-pointregulator in accordance with the invention will be described with reference to the diagrammatic representation of FIG. 4.

The regulator is to hold constant the pressure of a gas in the pressure container 10. The supply comes from the left via the valve 11, which is opened during operation.

The regulation is to be carried out by setting the removal valve 12 operated by means of a membrane. Pressure in the membrane chamber 13 brings about closing of the valve.

Figure 5:
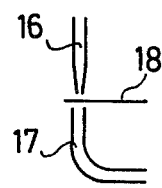
FIG. 5 shows a diagrammatic cross-section of a jet nozzle switch and a receiving nozzle.

The switching or operation of the regulator is carried out by means of two-jet nozzle switches 14 and 15, shown in a representation of one switch is FIG. 5 in a diagrammatic cross-section. The air pressure is passed into a jet nozzle 16, which is arranged opposite to a jet receiving nozzle 17. Between the jet and jet receiving nozzle of each nozzle switch 14 and 15 there moves the vane 18 made of sheet metal. In accordance with the position of the vane the air pressure is passed by the jet nozzle into the jet receiving nozzle or when the vane covers the receiving nozzle completely) the air pressure is restrained so that the receiving nozzle vents the line or duct connected thereto as is more fully described hereinafter.

The vane 18 has two oblique control edges 19 and 20, which in the zero or neutral position just cover the jet and jet receiving nozzle switches 14 and 15. The vane 18 is displaced in a parallel fashion by the manometer 21 in an upward direction in FIG. 4 when the pressure increases and is moved downwards when the pressure decreases. The manometer 21 consists of a stationary built-in bellows 22, which rests against the spring 24 and whose interior pace is connected by means of the line 23 with the pressure container 10. By means of the guide rod 25 the movement of the manometer is transmitted to the vane 18. Because of the feedback 26, which will be described later, the vane 18 can be displaced leftward in FIG. 4. The feedback in this case acts by means of the sliding guide arrangement 27 on the vane in order not to interfere with the movement produced by the manometer 21.

From the switch 14 there passes a line or duct 28 to the end of microswitches 29 and 0 and from the switch 15 there passes a line 33 to the end of switches 31 and 32 at the respective inlets 1 thereof.

The switches 30 and 32 control the supply and removal of fluid to the membrane chamber 13 of the regulating valve 12. The inlets 2 of these switches are open and the inlets 5 are closed. The inlet 4 of the switch 30 is open and the outlet 3 is connected via an adjustable choke or throttle valve 34 with the line 35 and therefore with the membrane chamber 13. The inlet 4 of the switch 32 receives feed air via the duct 37 while the outlet 3 is connected via an adjustable throttle or choke valve 36 with the line or duct 35.

The inlets 2 of the switches 29 and 31 are open while the inlets 5 are closed. The inlets 4 receive air feed via the duct or line 37. The outlets 3 are connected with each other via the line 38, from which the common line leads via the pre-choke valve 39 and the adjustable choke valve 45 to the return bellows 40. Between the choke 39 and the choke valve 45 a line 43 is connected, which leads via a further adjustable choke valve 44 to the atmosphere. The return bellows 40 is stationary and rests against the spring 42. The rod 41 connects the return bellows with the sliding arrangement 27 and the latter enables the return bellows, when pressure is present in it, to displace the vane 18 in a parallel fashion to the left in FIG. 4.

If there is an increase in pressure in the container 10, the manometer 21 moves the vane 18 upwards. The receiving nozzle 14 receives air pressure, which via the duct 28 actuates the microswitches 29 and 30. The switch 30 now connects the membrane chamber 13 of the regulator valve 12 via the line 35 and the choke valve 34 with the atmosphere. As a result compressed air can escape from the membrane chamber 13 and the regulation valve 12 becomes opened to a greater extent. Simultaneously the switch 29 passes compressed air via the ducts 37 and 38 and the pre-choke valve 39 and choke valve 45 to the return bellows 40. The vane 18 is displaced to the left until it again interrupts the air current through the jet and catching nozzle 14 and vents the line or duct 23. The end switches 29 and 30 are switched back. The line 35 is shut off from the atmosphere. The pressure in the membrane chamber 13 remains and the regulator valve 12 remains in its position. The duct or line 38 is cut off from the feed air. Via the choke valves 44 and 45 the pressure escapes from the return bellows 40. The spring 42 displaces the vane 18 to the right until it exposes the receiving nozzle 14 again and thus the whole operation is repeated again.

In this manner the regulator operates in uninterrupted steps and the steps are smaller in the case of small regulation deviations than in the case with large ones.

If the desired magnitude of the regulated value has been achieved and the feedback has returned, the vane 18 covers both receiving nozzles 14 and 15 and the regulator remains in a rest position.

If the pressure in the container 10 drops the manometer 21 moves the van downwards and releases the receiving nozzle 15. Pressure passes into the end switches 31 and 32 through the line 33. The switch 32 causes air feed to pass from the line 37 via the adjustable choke valve 36 into the membrane chamber 13 and the regulation valve 12 is moved towards the closed position. The return or feedback operation occurs exactly as described above in the case of rising pressure in the container and the closing of the regulation valve 12 is interrupted. In individual steps the regulation valve 12 is moved in the closing direction until the pressure in the container 10 achieves the desired value.

By choking the choke valves 34 and 36 the opening and closing of the regulation valve 12 can be slowed down and in connection with the choking of the choke valve 45, which slows down the return, the frequency of the regulation pulses and also the integral operation of the regulator can be adjusted. By setting the choke valve 44 the force of the return or feedback is influenced. It is also possible to adjust the strength of the pulses, that is for example the proportional range or the amplification thereof.

Figure 6:
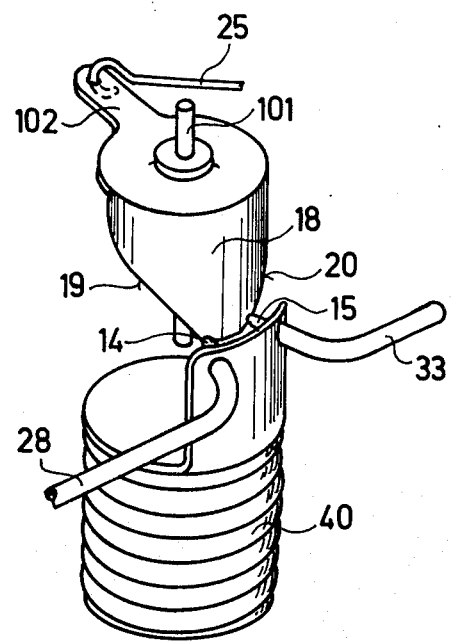
FIG. 6 shows a modified embodiment of the intermediate member for effecting a control operation.

FIG. 6 of the drawing shows an arrangement in the case where the intermediate member is rotated by the measurement value and the nozzles are displaced by the feedback in an axial direction. In FIG. 6 for purposes of clarity the bearings of the shaft 101 are omitted, about which the intermediate member is turned by the measurement value (manometer) via the lever 102. The remaining reference numerals of FIG. 6 correspond to the above-described parts. The three-point regulator in accordance with FIG. 6 is characterized more particularly in that the switches are operated or switched by means of an intermediate member, which is turned by the measurement valve and is displaced by the feedback in an axial direction or vice versa. The particular advantages of this arrangement are that no large forces or friction acts on the intermediate member, which might influence the results of measurement. It is therefore possible to achieve the maximum degree of accuracy of regulation.

The described regulator is conceived as a pneumatic regulator. It operates with jet and receiving nozzles as switches. Without departing from the principle of the invention it will be possible to use nozzles with impingement plates or baffles instead of this. It would also be possible for the regulator to operate with a hydraulic drive or the principle could be used in respect of electrical regulators.

I claim:

1. A pneumatic regulator of the three-point type for regulating a flow of fluid, comprising:

adjustable valve means for controlling the flow of fluid;

means for controlling said adjustable valve means to maintain a predetermined fluid pressure in a pressure container connected in the fluid flow path, including first and second pneumatically-operated switches and a vane mounted therebetween to be movable from a neutral position, whereby movement of said vane in a first direction respectively opens and closes said first and second pneumatically-operated switches and movement in a second direction respectively closes and opens said first and second pneumatically-operated switches;

said adjustable valve means increasing the fluid flow in response to said first pneumatically-operated witch being opened and decreasing the fluid flow in response to said second pneumatically-operated switch being opened;

means for moving said vane in said first and second directions respectively in accordance with an increasing and decreasing pressure in said pressure container;

feedback means responsive to said first or said second pneumatically-operated switch for moving said vane in a direction to close either said first or said second pneumatically-operated switch, whereby the distance said vane moves in either said first or said second direction to open or close said first and second pneumatically-operated switches is increased;

said feedback means includes a stationary bellows and means for biasing and bellows in a neutral position, first and second microswitches respectively connected to said first and second pneumatically-operated switches and both said first and second microswitches being connected to said statinary bellows, and means for relieving the pressure within said stationary bellows;

feed duct means for supplying air to said first and second microswitches; and said means for relieving includes a pre-choke valve connected to said first and second microswitches and to a first adjustable choke valve connected to said stationary bellows, and further including a second adjustable choke valve connected between said pre-choke valve and said first adjustable choke valve and open to the atmosphere.

2. A pneumatic regulator as in claim 1 wherein said means for controlling further includes third and fourth microswitches respectively connected between said first and second pneumatically-operated switches and said adjustable valve means, said third and fourth microswitches controlling said adjustable valve means to respectively increase and decrease the flow of said fluid in accordance with the respective opening of said first and second pneumatically-operated switches.

3. A pneumatic regulator of the three-point type for regulating a flow of fluid, comprising:

adjustable valve means for controlling the flow of fluid;

means for controlling said adjustable valve means to maintain a predetermined fluid pressure in a pressure container connected in the fluid flow path, including first and second pneumatically-operated switches and a vane mounted therebetween to be movable from a neutral position, whereby movement of said vane in a first direction respectively opens and closes said first and second pneumatically-operated switches and movement in a second direction respectively closes and opens said first and second pneumatically-operated switches;

said adjustable valve means increasing the fluid flow in response to said first pneumatically-operated switch being opened and decreasing the fluid flow in response to said second pneumatically-operated switch being opened;

means for moving said vane in said first and second directions respectively in accordance with an increasing and decreasing pressure in said pressure container;

feedback means responsive to said first or said second pneumatically-operated switch for moving said vane in a direction to close either said first or said second pneumatically-operated switch, whereby the distance said vane moves in either said first or said second direction to open or close said first and second pneumatically-operated switches is increased;

said feedback means includes a stationary bellows and means for biasing said bellows in a neutral position, first and second microswitches respectively connected to said first and second pneumatically-operated switches and both said first and second microswitches being connected to said stationary bellows, and means for relieving the pressure within said stationary bellows;

feed duct means for supplying air to said first and second microswitches; and each of said first and second pneumatically-operated switches include a jet nozzle for emitting a pneumatic flow and a receiving nozzle for receiving said pneumatic flow, said jet nozzle and said nozzle of said first and second pneumatically-operated switches being respectively mounted in aligned spaced relationship, said vane is a planar member and said first and second directions are along an axis extending between said first and second pneumatically-operated switches in the plane of said vane, and the displacement of said vane by said feedback means is in a direction normal to said axis.

4. A pneumatic regulator as in claim 3 wherein said means for controlling further includes third and fourth microswitches respectively connected between said first and second pneumatically-operated switches and said adjustable valve means, said third and fourth microswitches controlling said adjustable valve means to respectively increase and decrease the flow of said fluid in accordance with the respective opening of said first and second pneumatically-operated switches.

* * * * *